3,284,510
CARBONYLATION OF OLEFIN-POLYOLEFIN MIXTURES
James William Robinson, Baton Rouge, La., assignor to Esso Research and Engineering Company, a corporation of Delaware
No Drawing. Filed Feb. 12, 1963, Ser. No. 257,879
9 Claims. (Cl. 260—604)

The present invention relates to the production of oxygenated organic compounds by the reaction of carbon monoxide and hydrogen with carbon compounds containing olefinic linkages in the presence of a carbonylation catalyst. More specifically, the present invention relates to a carbonylation process whereby the quality of the product may be improved, the reaction time considerably reduced, and feed streams normally not utilizable in the process may be employed.

It is now well known in the art that oxygenated organic compounds may be synthesized from olefins by reaction of the latter with carbon monoxide and hydrogen in the presence of a catalyst containing cobalt or iron, preferably the former. The olefinic material, the catalyst, CO and $H_2$ are reacted usually to give a product comprising a mixture of aldehydes and alcohols and this material is hydrogenated in a later stage to give the corresponding primary alcohols. The over-all reaction consists essentially of an addition of $H_2$ and CO to the unsaturated linkage and may be formulated as follows:

Stage 1—$RCH=CH_2+CO+H_2 \rightarrow RCH_2—CH_2CHO$
Stage 2—$RCH_2CH_2CHO+H_2 \rightarrow RCH_2CH_2CH_2OH$ It is thus seen that both the aldehyde and the alcohol formed as a result of the reaction contain one more carbon atom than the olefinic material from which they are derived.

It has been found prior to this invention that not all olefinic substances are equally susceptible to the carbonylation or oxo reaction. Thus, some highly branched chain olefins react with difficulty, and others do not react at all. It has also been found that olefinic feedstocks resulting from cracking processes, particularly when steam cracking is employed, or when petrolatum is cracked, underwent the aldehyde synthesis reaction erratically. Some of these stocks could not be carbonylated at all under conventional carbonylation conditions, whereas other stocks from these sources exhibited a lengthy induction period prior to reaction. This difficulty in subjecting olefins to the aldehyde synthesis reaction has been traced to the conjugated diolefin impurity usually present in the feedstocks in amounts of 0.5 to 5 weight percent or higher. It has been suggested hitherto to treat the feedstock prior to the aldehyde synthesis in order to remove the impurity or render it harmless to the reaction. For example, the feedstock may be subjected to a selective hydrogenation step or may be treated with an organic peroxide prior to the carbonylation reaction. Both of these methods, however, require additional equipment and reactants and thereby reduce the economic attractiveness of the process.

It has now been discovered that the presence of the diolefin impurity not only increases the induction time, that is, the length of time necessary for the reaction to start, but also its presence in a continuous carbonylation process may cause a decrease in the reaction rate and eventually may kill the reaction. This latter adverse effect is a serious handicap to reactor capacity since it has necessitated a reduction in the throughput rate of reactants in order to sustain the carbonylation process. By this invention a method has been developed which overcomes both of the above-mentioned effects of the diolefin impurity without the use of additional treating steps or equipment prior to the carbonylation process.

It is an object of the present invention to provide an improved and novel oxo process wherein the induction period caused by the presence of diolefins is drastically reduced.

It is a further object of this invention to provide an improved oxo process wherein the reaction rate is maintained despite the presence of diolefin impurity in the feedstock.

In accordance with the present invention a conjugated diolefin contaminated feedstock containing more than 0.5 wt. percent and as much as 5 wt. percent of a conjugated diolefin is carbonylated at superatmospheric pressure and elevated temperature with a hydrogen/carbon monoxide synthesis gas containing a large excess of carbon monoxide. By using molar ratios of $CO/H_2$ greater than 1.3/1 it has been unexpectedly discovered that the induction time, or time between introduction of the reactants to the reactor and the initiation of the reaction, may be greatly reduced. This result was contrary to expectations since present theory would lead to the belief that the reaction would be favored by decreased CO concentration in the reactor.

Although the mechanism by which conjugated diolefins poison the carbonylation reaction is not known, it has now been discovered, as previously stated, that they have a deleterious effect not only on the induction period for the reaction but also on its continuous operation. Hence, the reaction is not self-sustaining once it is initiated but is dependent upon continuous removal of the poison from the system. A buildup of diolefin poison will cause a steady reduction in the reaction rate and will eventually stop the reaction entirely. This reduction in rate would be accelerated by increasing the throughput rate of carbonylation reactants and reactor capacity is thereby severely limited. It is within the scope of the present invention to use a continuous stream of CO enriched synthesis gas in order to maintain the reaction rate. It is also within the scope of this invention to reinitiate a diolefin poisoned carbonylation reaction by admitting excess amounts of CO to the reactor.

Thus the present invention has the advantages of being able to reduce the induction time and maintain or revive the reaction rate of a diolefin contaminated carbonylation reaction and thereby makes it possible for the reaction to be carried out safely with higher feed rates without loss of reaction and results in more efficient operation. A further advantage of the invention is that it requires no additional equipment and may be used in existing commercial oxo equipment.

The molar ratios of $CO/H_2$ synthesis gas which may be utilized in the process of this invention are in the range of about 1.3:1 to 4:1 although a $CO/H_2$ ratio of about 1.9:1 to 3:1 is preferred. The above-mentioned molar ratios of synthesis gas may be admitted to the reactor in a continuous stream or may be alternated with normal $H_2$-rich synthesis gas in order to revive or increase the reaction rate of the diolefin contaminated system. The quantity of $H_2+CO$ with respect to olefins used may vary within wide ranges, for example, from 2500 to 45,000 cubic feet of $H_2+CO$ per barrel of olefin feed. In general about 4000 to 10,000 cubic feet $H_2+CO$ per barrel of olefin feed are employed.

The carbonylation process using the CO enriched synthesis gas may be used with a wide variety of olefinic compounds containing substantial concentrations of diolefin. It may be used effectively with long and short chain olefins depending on the type alcohol desired. Thus straight and branch chained olefins, such as propylene, butylene, pentene, hexene, heptene; olefin polymers such as di- and tri-isobutylene, hexene and heptene dimers, polypropylenes, such as tetrapropylene, and olefinic fractions obtained by steam cracking or vapor phase cracking of naphthas, gas oils, petrolatums and waxes may be used as starting materials, depending on the nature of the final product desired. In general, olefins having up to about 18–20 carbon atoms in the molecule are preferred.

The catalyst employed in the carbonylation stage of the invention is not critical and is generally the same as in prior art processes. However, it is contemplated that various improved catalysts now being developed may be used in the present process. The catalyst is usually added in the form of salts of the catalytically active metal with high molecular weight fatty acids, such as decanoic, stearic, oleic, naphthenic, etc., acids. Thus suitable catalysts are, for example, cobalt decanoate or oleate. These salts are soluble in the liquid olefin feed and may be supplied in the first stage as hydrocarbon solution or dissolved in olefin feed. Also, preformed cobalt carbonyl, as well as inorganic forms of cobalt, as cobalt oxide, also cobalt acetate and formate and carbonate may be used. Aqueous solutions containing the cobalt carbonyl anion may also be used. The concentration of catalyst may vary over a wide range, e.g., 0.01 to 2.0 weight percent, and preferably at least 0.1 percent, by weight of cobalt, calculated as metal dissolved in the liquid olefin feed.

The conditions for olefins reacting with $H_2$ and CO vary somewhat in accordance with the nature of the olefin feed, but the reaction is generally conducted at pressures in the range of about 1000 to 4500 p.s.i.g., preferably 2500 to 3500 p.s.i.g., and at temperatures in the range of about 150° F. to 450° F., preferably 250° to 450° F., and preferably for reaction times sufficient to obtain conversions to oxygenated products of at least 80%.

This invention is illustrated by the following examples.

*Example 1*

The following runs were carried out to determine the effect of diolefins in the feed stream for the carbonylation reaction. The feed streams are summarized in tabular form. The reaction was carried out at 3000 p.s.i.g. total pressure and 300° F. in the presence of 0.2 wt. percent, based on olefin, of a dissolved cobalt decanoate catalyst. The synthesis gas for the standard runs had a molar ratio of $1/1.8$ $CO/H_2$ which is the ratio commonly used in present commercial operations. Runs made in accordance with the invention had a molar ratio of $2/1$ $CO/H_2$. The analysis of the petrolatum cut was as follows:

| | Percent |
|---|---|
| Monoolefin | 94.8 |
| Paraffin and naphthenes | 0.2 |
| Nonconjugated dienes | 2.1 |
| Conjugated dienes | 2.9 |
| Aromatics | 0 |

TABLE I

| Run | Feed | CO/H₂ | Induction Period |
|---|---|---|---|
| 1 | Pure C8 olefin | 1/1.8 | 0. |
| 2 | C8 olefin+2% piperylene (C—C=C—C=C). | 1/1.8 | 230 min. |
| 3 | C8 olefin+2% methyl butadiene (—C=C—C=C). | 1/1.8 | 267 min. |
| 4 | Narrow cut C₇ petrolatum olefin. | 1/1.8 | 95 min. |
| 5 | ___do___ | 2/1 | 5 min. |
| 6 | Wide cut C₇ petrolatum | 1/1.8 | No reaction in 285 min. |
| 7 | ___do___ | 2/1 | 120 min. |

The results of this experiment indicate the poisonous effect of diolefins on the carbonylation reaction. Analysis of the samples during the induction period showed a steady loss of diolefin until the concentration was as low as 0.5% at which point the reaction took place. The results further show the greatly reduced induction period achieved by the practice of this invention (compare runs 4 and 5 and also runs 6 and 7, for example).

*Example 2*

The carbonylation reaction was carried out using the reaction conditions of Example 1 to determine the effect of excess CO on the reaction rate.

TABLE II

| Run | Feed | Time (after induction period) | Unconverted Feed, percent |
|---|---|---|---|
| 1 | Pure C8 olefin | 30 min. | 26 |
| | | 2 hr. | 15 |
| | | 4 hr. | 15 |
| 2 | Narrow Cut C₇ Petrolatum Olefin (as in Example 1). | 18 min. | 20 |

The results of this comparison indicated that the excess CO does not slow down the carbonylation reaction.

*Example 3*

A feed consisting of a $C_7$ petrolatum olefin containing 1.7% conjugated diene mixed with 2% piperylene, a $C_5$ conjugated diene, was fed to a carbonylation reactor at the rate of 1 volume/volume of reactor/per hour. Reaction conditions included contact with a $1/1.7$ $CO/H_2$ gas and 0.2 weight percent of cobalt based on olefin, of a cobalt decanoate catalyst. The reactor pressure was maintained at 2900 p.s.i.g. and a temperature of 350° F. Carbonylation was maintained at these conditions. The feed rate was then increased to 1.25 volumes of olefin feed/volume of reactor. The carbonylation reaction was lost under these conditions.

The synthesis gas pressure was then released and the system was repressurized with 900 p.s.i.g. of pure CO and 2000 p.s.i.g. of a synthesis gas having a molar ratio of $1/1.7$ $CO/H_2$. Under these conditions reaction was reinitiated.

The results of this experiment indicate that the use of excess CO with diolefin contaminated feeds allows the reaction to proceed with higher feed rates and would therefore increase the capacity of a commercial operation.

The products from the carbonylation stage may be transferred to a catalyst removal zone where soluble catalyst is removed by suitable demetallizing means and thence to a hydrogenation vessel where the aldehydes are hydrogenated to alcohols in a conventional manner. These primary alcohols are valuable as intermediates for detergents or plasticizers.

While the foregoing description and comparative operations serve to illustrate specific applications and results, the invention is not limited thereto. Other modifications may appear to one skilled in the art.

What is claimed is:

1. A process for producing oxygenated organic compounds which comprises carbonylating an olefin feed containing a minor amount of a conjugated diolefin with carbon monoxide and hydrogen having a $CO:H_2$ molar ratio of at least $1.3/1$ to about $4/1$ at a temperature in the range of 150° F. to 450° F. and a pressure in the range of about 1000 to 4500 p.s.i.g. in the presence of a cobalt containing catalyst.

2. A process for producing oxygenated organic compounds which comprises carbonylating an olefin feed, containing an amount of a conjugated diolefin sufficient to poison said carbonylation, with carbon monoxide and hydrogen at a temperature in the range of 150° to 450° F. and a pressure in the range of about 1000 to 4500 p.s.i.g. in the presence of a cobalt containing catalyst for a time sufficient to obtain substantial conversions to oxygenated compounds and maintaining a molar ratio of $CO/H_2$ in the range of at least 1.3/1 to 4/1 for at least a time sufficient to inactivate said diolefin poison.

3. The process of claim 2 wherein the catalyst is introduced to the reaction as a cobalt salt.

4. The process of claim 2 wherein the catalyst is introduced to the reaction as cobalt carbonyl.

5. The process of claim 2 wherein said ratio of $CO/H_2$ is maintained continuously throughout the reaction.

6. The process of claim 2 wherein the molar ratio of $CO/H_2$ is within the range of about 1.9/1 to 3/1.

7. The process of claim 2 wherein the amount of conjugated diolefin in the feed exceeds 0.5 weight percent of the total olefin feed.

8. A continuous process for producing oxygenated organic compounds which comprises continuously introducing an olefin feed containing 0.5 to 5.0 wt. percent of a conjugated diolefin, carbon monoxide, hydrogen, and catalytic amounts of a cobalt containing catalyst into a reaction zone, maintaining a pressure in said reaction zone in the range of 1000 to 4500 p.s.i.g. and a temperature in the range of 150 to 450° F. for a time sufficient to obtain at least an 80% conversion to oxygenated compounds and maintaining a molar ratio of $CO/H_2$ in the range of 1.9/1 to 3/1 during a substantial portion of the reaction period.

9. The process of claim 8 where said molar ratio of $CO/H_2$ is maintained continuously throughout the reaction.

References Cited by the Examiner

UNITED STATES PATENTS

| | | | |
|---|---|---|---|
| 2,596,920 | 5/1952 | Smith et al. | 260—604 |
| 2,694,091 | 11/1954 | Harvey et al. | 260—604 |
| 2,752,397 | 6/1956 | Taylor et al. | 260—604 |
| 2,796,436 | 6/1957 | Buchmann et al. | 260—604 |

OTHER REFERENCES

Pino et al.: Chemistry and Industry, No. 35 (1961), pages 1400–1401.

LEON ZITVER, *Primary Examiner.*

B. HELFIN, R. H. LILES, *Assistant Examiners.*